US009304353B2

(12) United States Patent
Yu et al.

(10) Patent No.: US 9,304,353 B2
(45) Date of Patent: Apr. 5, 2016

(54) DIRECT BACKLIGHT MODULE

(71) Applicant: Shenzhen China Star Optoelectronics Technology Co., Ltd., Shenzhen, Gunagdong (CN)

(72) Inventors: Gang Yu, Shenzhen (CN); Shihhsiang Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 175 days.

(21) Appl. No.: 14/235,418

(22) PCT Filed: Nov. 13, 2013

(86) PCT No.: PCT/CN2013/087074
§ 371 (c)(1),
(2) Date: Jan. 27, 2014

(87) PCT Pub. No.: WO2015/066941
PCT Pub. Date: May 14, 2015

(65) Prior Publication Data
US 2015/0301404 A1    Oct. 22, 2015

(30) Foreign Application Priority Data
Nov. 5, 2013  (CN) .......................... 2013 1 0542893

(51) Int. Cl.
*G09F 13/04*   (2006.01)
*G02F 1/1335*   (2006.01)

(52) U.S. Cl.
CPC .... *G02F 1/133603* (2013.01); *G02F 1/133608* (2013.01); *G02F 2001/133612* (2013.01)

(58) Field of Classification Search
CPC ............... G02F 1/133602; G02F 1/133603; G02F 1/133608; G02F 1/1335
See application file for complete search history.

(56) References Cited

U.S. PATENT DOCUMENTS

| 2003/0111701 | A1 | 6/2003 | Yoo |
| 2006/0066767 | A1 | 3/2006 | Kao et al. |
| 2007/0002590 | A1* | 1/2007 | Jang .................. G02F 1/133603 362/633 |

(Continued)

FOREIGN PATENT DOCUMENTS

| CN | 2699332 Y | 5/2005 |
| CN | 1924656 A | 3/2007 |

(Continued)

*Primary Examiner* — Andrew Coughlin
(74) *Attorney, Agent, or Firm* — Andrew C. Cheng

(57) ABSTRACT

The present invention provides a direct backlight module, which includes: a backplane (2), a plurality of backlight sources (4) mounted in the backplane (2), and a diffusion board (8) mounted on the backplane (2) and located above the backlight sources (4). The backplane (2) includes a bottom board (20) and a plurality of side boards (22) perpendicularly connected to the bottom board (20). The bottom board (20) includes a plurality of detachable carrier plates (24). The backlight sources (4) are mounted on the carrier plates (24). The direct backlight module of the present invention includes a plurality of carrier plates pieced together to form a bottom board of a backplane so that in assembling the backlight module, it is possible to simultaneously mount backlight sources to the plurality of carrier plates to thereby enhance the assembling efficiency. Further, when the backlight sources of some of the carrier plates are damaged, it only needs to re-work on the individual carrier plates of which the backlight sources are damaged so as to enhance the re-working efficiency.

14 Claims, 3 Drawing Sheets

(56) References Cited

U.S. PATENT DOCUMENTS

2012/0044667 A1* 2/2012 Hanawa .................. H01L 33/46
362/97.1
2012/0147592 A1* 6/2012 Takase .............. G02F 1/133608
362/97.1

FOREIGN PATENT DOCUMENTS

| CN | 101101409 A | 1/2008 |
| CN | 101191949 A | 6/2008 |
| CN | 101498860 A | 8/2009 |

* cited by examiner

DIRECT BACKLIGHT MODULE

BACKGROUND OF THE INVENTION

1. Field of the Invention

The present invention relates to a backlight module, and in particular to a direct backlight module that improves assembling efficiency and re-working efficiency.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal panel and a backlight module. The operation principle of the liquid crystal panel is that, with liquid crystal molecules interposed between two parallel glass substrates, a plurality of vertical and horizontal tiny wires is arranged between the two glass substrates and application of electricity is selectively carried out to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel.

Referring to FIG. 1, a conventional direct backlight module comprises: a backplane 100 and a backlight source 200 arranged inside the backplane 100. The backlight source 200 is mounted to a bottom board 102 of the backplane 100 and the backlight source 200 comprises a PCB substrate 202, wiring patterns 204 formed on the PCB substrate 202, and light-emitting diode (LED) lights 206 mounted to and electrically connected with the wiring patterns 204. However, such a structure of direct backlight module comprises a number of components and thus the manufacturing process is complicated.

Referring to FIG. 2, another conventional direct backlight module is shown. Backlight sources 200' each comprise only wiring a pattern 204 and an LED light 206 mounted to and electrically connected with the wiring pattern 204. A bottom board 102 of a backplane 100 is provided with an electrical insulation layer 300 and the backplane 100 is made of a metallic material of high thermal conductivity. The backlight sources 200' are directly mounted on the bottom board 102 of the backplane 100 via the electrical insulation layer 300. Such a structure of direct backlight module eliminates the use of a PCB substrate so that the components used are reduced, the manufacturing process is simplified, and the manufacturing cost is lowered down. Further, mounting the backlight sources 200' directly on the bottom board 102 of the backplane 100 that is of high thermal conductivity via the electrical insulation layer 300 achieves a bettered effect of heat dissipation.

However, it is necessary to separately mount a plurality of backlight sources 200' to the bottom board 102 of the backplane 100. The manufacturing efficiency is low. Particularly, when the LED light 206 of an individual backlight source 200' is damaged and re-working is needed, re-working must be applied to the entire backplane 100 so that the re-working efficiency is extremely low.

SUMMARY OF THE INVENTION

An object of the present invention is to provide a direct backlight module that comprises a plurality of carrier plates jointed to each other to form a bottom board of a backplane in order to assembling efficiency and re-working efficiency.

To achieve the above object, the present invention provides a direct backlight module, which comprises: a backplane, a plurality of backlight sources mounted in the backplane, and a diffusion board mounted on the backplane and located above the backlight sources. The backplane comprises a bottom board and a plurality of side boards perpendicularly connected to the bottom board. The bottom board comprises a plurality of detachable carrier plates, the backlight sources being mounted on the carrier plates.

The carrier plates are made of a metallic material.

The backlight sources each comprise a wiring pattern and a light-emitting diode (LED) light electrically connected to the wiring pattern.

The carrier plates each comprise a plurality of electrical insulation layers formed thereon to correspond to the backlight sources. The wiring patterns are formed on the electrical insulation layers.

The carrier plates each comprise a carrying section and coupling sections respectively and perpendicularly connected to two ends of the carrying section. The coupling sections are mounted to the side boards.

The electrical insulation layers are formed on the carrier plates through spray-coating or printing.

The backlight sources are mounted to the electrical insulation layers through adhering or screwing.

The wiring patterns are made of a metallic material.

The wiring patterns are made of copper.

The carrier plates are made of aluminum.

The present invention also provides a direct backlight module, which comprises: a backplane, a plurality of backlight sources mounted in the backplane, and a diffusion board mounted on the backplane and located above the backlight sources, the backplane comprising a bottom board and a plurality of side boards perpendicularly connected to the bottom board, the bottom board comprising a plurality of detachable carrier plates, the backlight sources being mounted on the carrier plates;

wherein the carrier plates each comprise a carrying section and coupling sections respectively and perpendicularly connected to two ends of the carrying section, the coupling sections are mounted to the side boards;

wherein the carrier plates are made of a metallic material;

wherein the backlight sources each comprise a wiring pattern and a light-emitting diode (LED) light electrically connected to the wiring pattern;

wherein the carrier plates each comprise a plurality of electrical insulation layers formed thereon to correspond to the backlight sources, the wiring patterns being formed on the electrical insulation layers; and wherein the electrical insulation layers are formed on the carrier plates through spray-coating or printing.

The backlight sources are mounted to the electrical insulation layers through adhering or screwing.

The wiring patterns are made of a metallic material.

The wiring patterns are made of copper.

The carrier plates are made of aluminum.

The efficacy of the present invention is that the present invention provides a direct backlight module, which comprises a plurality of carrier plates pieced together to form a bottom board of a backplane so that in assembling the backlight module, it is possible to simultaneously mount backlight sources to the plurality of carrier plates to thereby enhance the assembling efficiency. Further, when the backlight sources of some of the carrier plates are damaged, it only needs to re-work on the individual carrier plates of which the backlight sources are damaged so as to enhance the re-working efficiency.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
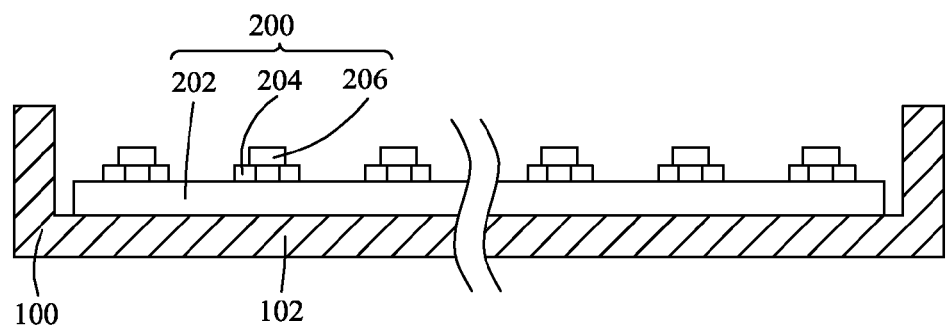
FIG. 1 is a schematic view showing the structure of a conventional direct backlight module.
Figure 2:
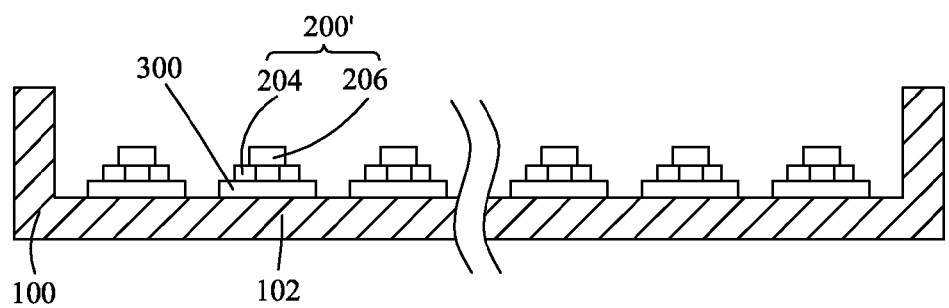
FIG. 2 is a schematic view showing the structure of another conventional direct backlight module.
Figure 3:
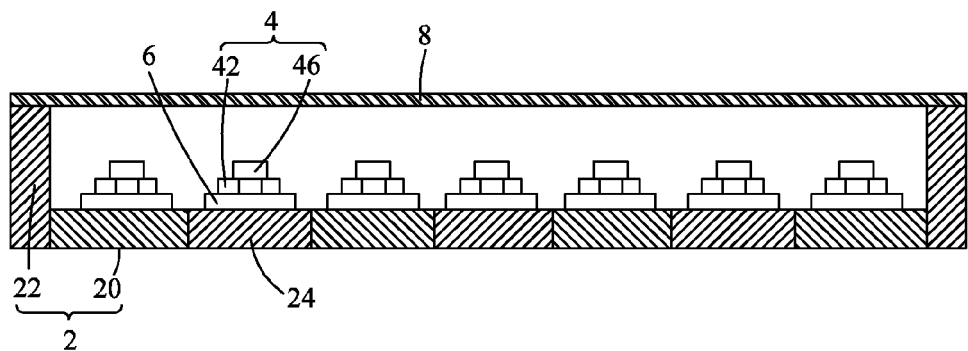
FIG. 3 is a schematic view, in a sectioned form, showing the structure of a direct backlight module according the present invention.
Figure 4:
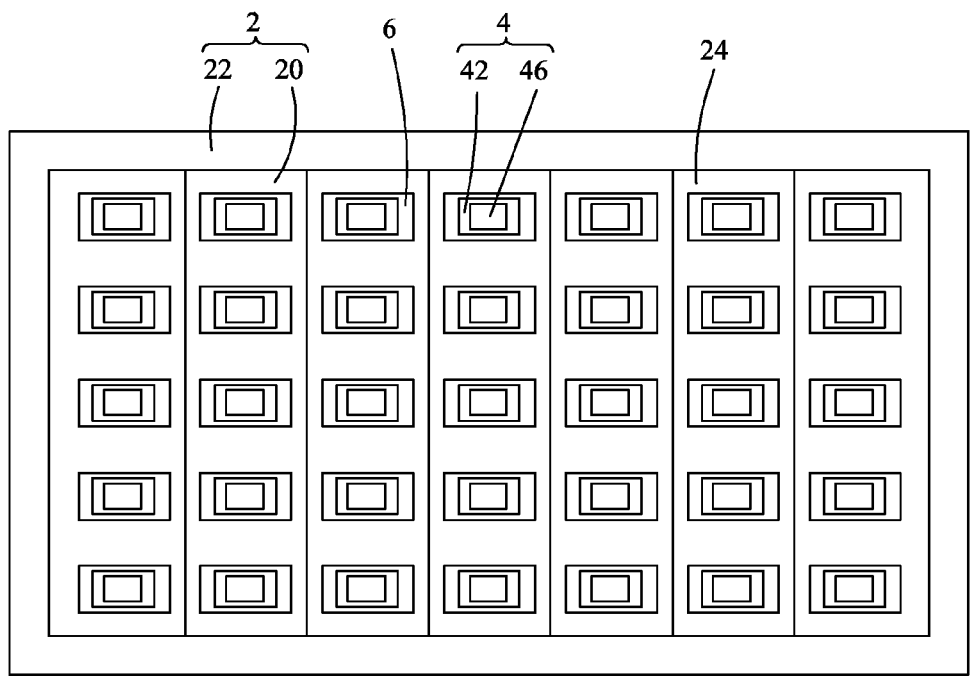
FIG. 4 is a top plan view showing backlight sources and a backplane of FIG. 3.
Figure 5:
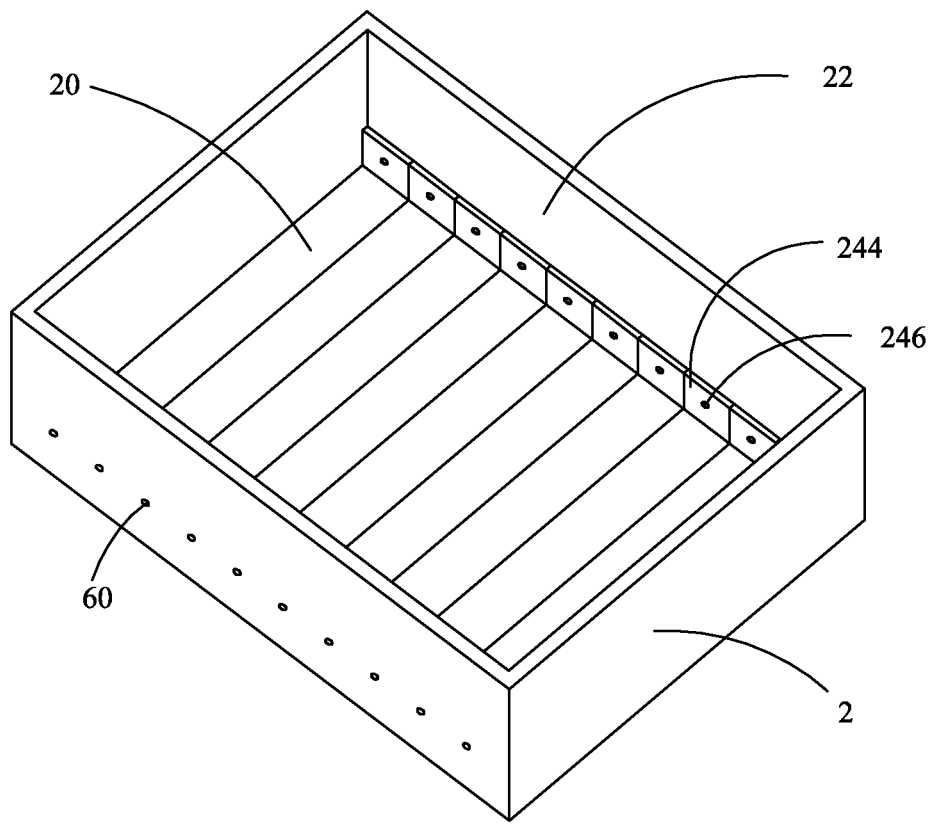
FIG. 5 is a schematic view showing the structure of the backplane of the direct backlight module according to the present invention.
Figure 6:
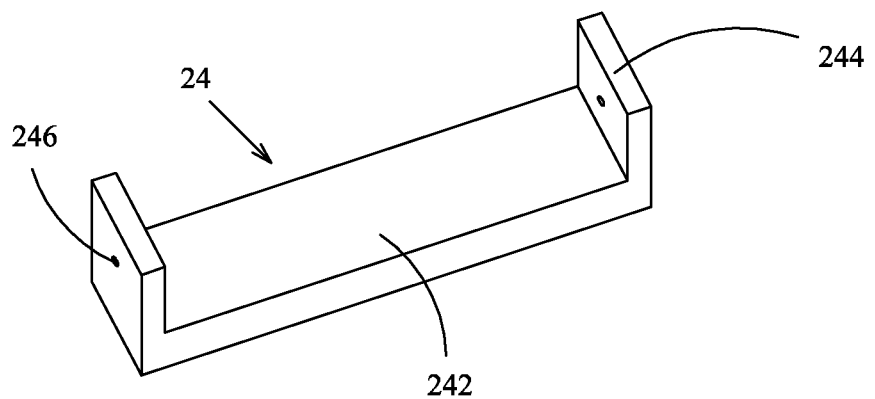
FIG. 6 is a perspective view showing a carrier plate of FIG. 5.

Referring to FIGS. 3 and 4, the present invention provides a direct backlight module, which comprises: a backplane 2, a plurality of backlight sources 4 mounted in the backplane 2, and a diffusion board 8 mounted on the backplane 2 and located above the backlight sources 4. The backplane 2 comprises a bottom board 20 and a plurality of side boards 22 perpendicularly connected to the bottom board 20. The bottom board 20 comprises a plurality of detachable carrier plates 24. The backlight sources 4 are mounted on the carrier plates 24. In the instant embodiment, the plurality of carrier plates 24 is mounted to the side boards 22 of the backplane 2 through snap-fitting or screwing. When an individual one of the backlight sources 4 requires maintenance or replacement, such an operation can be immediately carried out by simply detaching the one of the carrier plates 24 associated with the backlight source 4, so that the operation is easy and the maintenance and re-working efficiency can be enhanced.

The carrier plates 24 are made of a metallic material of high thermal conductivity and in the instant embodiment, the carrier plates 24 are made of aluminum, so that heat generated by the backlight sources 4 mounted on the carrier plates 24 can be dissipated as soon as possible to thereby enhance the effect of heat dissipation of the backlight module.

In the instant embodiment, the carrier plates 24 each comprise a carrying section 242 and coupling sections 244 respectively and perpendicularly connected to two ends of the carrying section 242. The two coupling sections 244 of each carrier plate 24 are respectively mounted to the side boards 22 by screws 60 in order to fix the carrier plate 24 to the side boards 22 to form the backplane 2. Specifically, counterbore holes (not shown) are formed in the side boards 22 and threaded holes 246 are formed in the coupling sections 244 at locations corresponding to the counterbore holes so that screws 60 can be applied to screw the coupling sections 244 and the side boards 22 together.

Further, the backlight sources 4 each comprise a wiring pattern 42 and a light-emitting diode (LED) light 46 electrically connected to the wiring pattern 42. The wiring patterns 42 are made of metals, preferably copper, and are formed, specifically, by means of spray-coating, printing, or other circuit pattern manufacturing processes. Such manufacturing processes are equally applicable to achieve the technical result of the present invention.

Specifically, the carrier plates 24 each comprise a plurality of electrical insulation layers 6 formed thereon to correspond to the backlight sources 4. The electrical insulation layers 6 can be formed on the carrier plates 24 by means of spray-coating, printing, or adhering. The electrical insulation layers 6 can be made of thermal paste in order to further better the effect of heat dissipation.

The wiring patterns 42 of the backlight sources 4 are respectively arranged on the electrical insulation layers 6 and are attached to the electrical insulation layers 6 by means of adhering or screwing so as to mount the LED lights 46 to the carrier plates 24.

To assemble the direct backlight module, the carrier plates 24 are each first assembled with a plurality of backlight sources 4 and a plurality of carrier plates 24 that comprise the backlight sources 4 assembled thereon is then mounted to the side boards 22 of the backplane 2. Finally, the diffusion board 8 is mounted above the backlight sources 4 to complete the assembling of the direct backlight module. A number of carrier plates 24 can be subjected simultaneously to the assembling of backlight sources 4 thereto so that the assembling efficiency can be improved. When backlight sources 4 of the carrier plates 24 are damaged and re-working is needed, it only needs to re-work on the individual carrier plate 24 of which the backlight sources 4 are damaged so that the efficiency of re-working is enhanced.

It is noted that the direct backlight module may further comprise an optic film assembly (not shown) that is arranged on the diffusion board 8, so that lights emitting from the backlight sources 4 enter the diffusion board 8 first and then transmit into the optic film assembly to provides a planar light source of uniform illumination.

In summary, the present invention provides a direct backlight module, which comprises a plurality of carrier plates pieced together to form a bottom board of a backplane so that in assembling the backlight module, it is possible to simultaneously mount backlight sources to the plurality of carrier plates to thereby enhance the assembling efficiency. Further, when the backlight sources of some of the carrier plates are damaged, it only needs to re-work on the individual carrier plates of which the backlight sources are damaged so as to enhance the re-working efficiency.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A direct backlight module, comprising: a backplane, a plurality of backlight sources mounted in the backplane, and a diffusion board mounted on the backplane and located above the backlight sources, the backplane comprising a plurality of side boards connected to-each other to enclose and delimit an interior space having an open top to which the diffusion board is mounted and an opposite open bottom, a plurality of carrier plates being arranged side by side to be immediately adjacent to each other and detachably mounted to and closing the open bottom of the backplane to serve as a closed bottom board of the backplane, the backlight sources being mounted on a surface of each of the carrier plates that faces the diffusion board so as to be located in the interior space of the backplane and under the diffusion board, wherein the carrier plates each comprise a carrying section on which the surface of the carrier plate is defined to receive the backlight sources mounted thereon and coupling sections respectively connected to two ends of the carrying section and extending in a direction perpendicular to the surface of the carrier plate, the coupling sections being mounted to the side boards in a detachable manner and located in the interior space of the backplane.

2. The direct backlight module as claimed in claim 1, wherein the carrier plates are made of a metallic material.

3. The direct backlight module as claimed in claim 2, wherein the carrier plates are made of aluminum.

4. The direct backlight module as claimed in claim 1, wherein the backlight sources each comprise a wiring pattern and a light-emitting diode (LED) light electrically connected to the wiring pattern.

5. The direct backlight module as claimed in claim 4, wherein the carrier plates each comprise a plurality of electrical insulation layers formed thereon to correspond to the backlight sources, the wiring patterns being formed on the electrical insulation layers.

6. The direct backlight module as claimed in claim 5, wherein the electrical insulation layers are formed on the carrier plates through spray-coating or printing.

7. The direct backlight module as claimed in claim 5, wherein the backlight sources are mounted to the electrical insulation layers through adhering or screwing.

8. The direct backlight module as claimed in claim 4, wherein the wiring patterns are made of a metallic material.

9. The direct backlight module as claimed in claim 8, wherein the wiring patterns are made of copper.

10. A direct backlight module, comprising: a backplane, a plurality of backlight sources mounted in the backplane, and a diffusion board mounted on the backplane and located above the backlight sources, the backplane comprising a plurality of side boards connected to each other to enclose and delimit an interior space having an open top to which the diffusion board is mounted and an opposite open bottom, a plurality of carrier plates being arranged side by side to be immediately adjacent to each other and detachably mounted to and closing the open bottom of the backplane to serve as a closed bottom board of the backplane, the backlight sources being mounted on a surface of each of the carrier plates that faces the diffusion board so as to be located in the interior space of the backplane and under the diffusion board;

wherein the carrier plates each comprise a carrying section on which the surface of the carrier plate is defined to receive the backlight sources mounted thereon and coupling sections respectively connected to two ends of the carrying section and extending in a direction perpendicular to the surface of the carrier plate, the coupling sections being mounted to the side boards in a detachable manner and located in the interior space of the backplane;

wherein the carrier plates are made of a metallic material;

wherein the backlight sources each comprise a wiring pattern and a light-emitting diode (LED) light electrically connected to the wiring pattern;

wherein the carrier plates each comprise a plurality of electrical insulation layers formed thereon to correspond to the backlight sources, the wiring patterns being formed on the electrical insulation layers; and wherein the electrical insulation layers are formed on the carrier plates through spray-coating or printing.

11. The direct backlight module as claimed in claim 10, wherein the backlight sources are mounted to the electrical insulation layers through adhering or screwing.

12. The direct backlight module as claimed in claim 10, wherein the wiring patterns are made of a metallic material.

13. The direct backlight module as claimed in claim 12, wherein the wiring patterns are made of copper.

14. The direct backlight module as claimed in claim 10, wherein the carrier plates are made of aluminum.

* * * * *